Patented Dec. 19, 1939

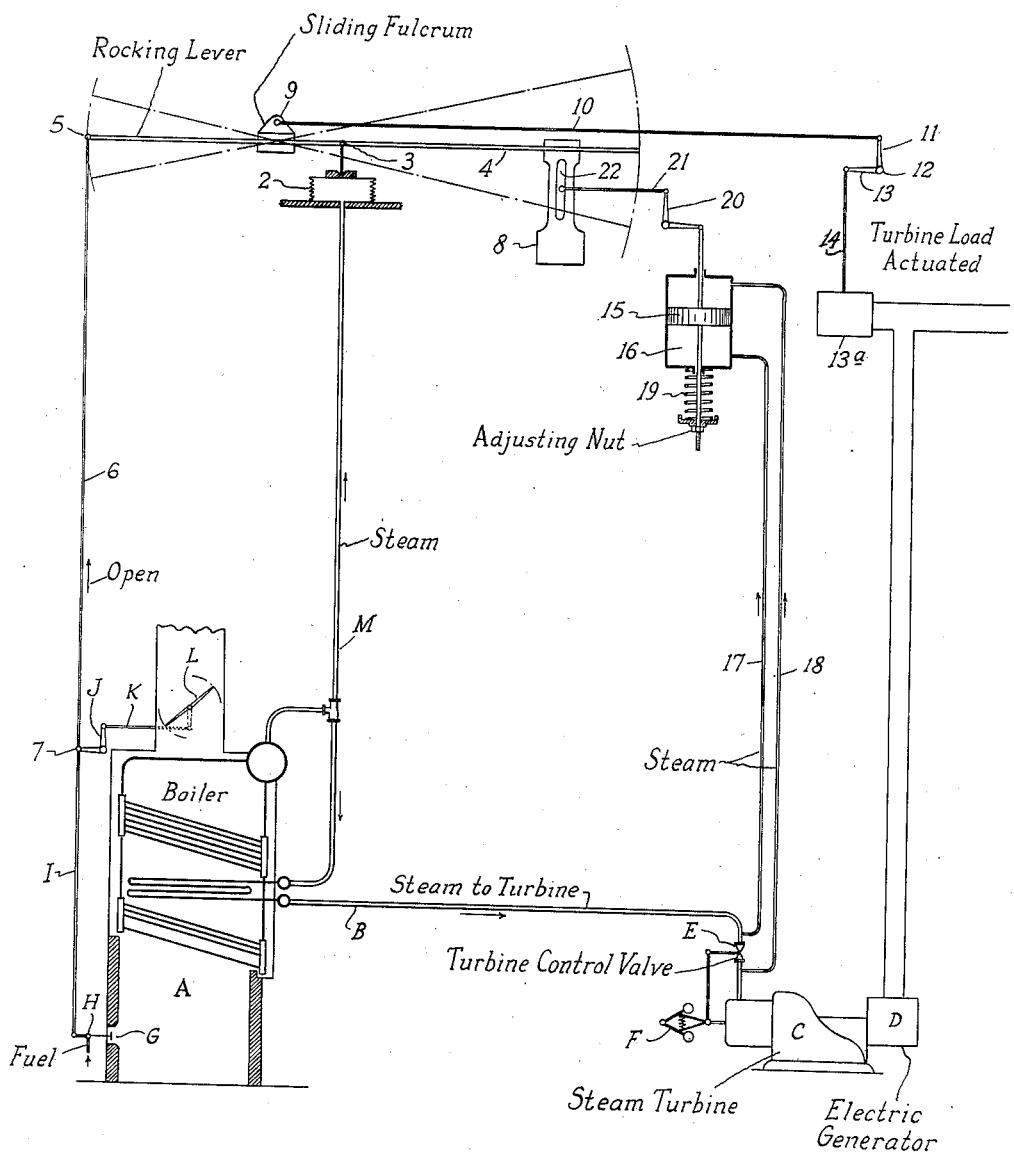

2,184,224

UNITED STATES PATENT OFFICE 2,184,224

METHOD AND APPARATUS FOR THE OPERATION OF STEAM BOILERS AND ACCESSORY DEVICES

Charles E. Lucke, New York, N. Y., assignor to The Babcock & Wilcox Company, Newark, N. J., a corporation of New Jersey Application February 17, 1937, Serial No. 126,134

11 Claims. (Cl. 60—105)

This invention is a method of operation of a steam generator and apparatus therefor in conjunction with a turbine operated at pressures that vary with the load on the turbine.

At the present time it is customary to operate modern steam-turbine power plants at a substantially constant steam pressure over their entire load range and also maintain a steam temperature as nearly constant as may be practicable for the design of boiler used. When driving electric generators, for example, the load variation has the widest possible range, and time rate of change, subject to conditions external to the generating unit.

Such turbines must operate at a constant speed for synchronous operation of generators, and speed is normally maintained constant when load changes take place by the usual speed actuated governing steam valve system which in many units is complicated and expensive.

These turbine governing valves function to reduce the area available for flow of steam, or throttle the steam at light loads so that with the constant pressure of steam available at the throttle there is, nevertheless, a lower pressure at the first steam nozzle, and successively lower as the load decreases. With a varying initial pressure of steam at the first nozzles as load changes, and the same steam path through the nozzles and vanes and to the condenser, for all loads, the turbine efficiency varies with load, the efficiency being greatest for maximum or designed load of the turbine and decreasing considerably as load decreases in spite of design details that have been developed to keep efficiency fairly constant over a fair range of load near that value for which the particular turbine is designed.

When a steam turbine must operate at an inefficiently low load over a considerable interval of time, the fuel expense for power is greater than it is otherwise and to minimize this excess fuel expense in a central station power plant the load is usually divided between several turbo-generators and periodically re-divided to keep each turbo-generator operating as near as possible to its most efficient load. This involves frequent shutdown and starting of units which is not only a source of expense but a considerable hazard, and in some cases it requires the installation and expense of maintenance of a larger number of turbo-generator units than would otherwise be needed with consequent excess of investment expense.

It is an object of the present invention to provide a method and means of operating a steam turbine power plant in a manner to be more economical at light loads without change of conditions at full load, and which may be applied to existing boilers and steam turbines at a relatively nominal expense. I accomplish this result by reducing the steam pressure at the boiler as the turbine load is reduced so that there is practically no pressure drop through the governing valves, or only a relatively small pressure drop. By so doing the light load efficiency of the turbine is increased, and also the light load efficiency of the boiler, the overall efficiency of the boiler and turbine combination being doubly raised as load decreases so as to keep it more nearly at the maximum value for the designed load of the unit than has been possible without my invention.

The turbine efficiency is increased by the reduced steam pressure and elimination of pressure drop through the governing valves because such pressure drop produces a steam velocity which is not utilized in the turbine but is lost by impact, by the reduced pressure method of my invention the energy equivalent appears as a rise of steam temperature entering the first nozzles. When this pressure drop through the governing valve is eliminated or reduced a larger volume of steam at the lower pressure is supplied to the turbine nozzles and vanes which have a fixed area for steam flow and the conditions more nearly approach those of a constant volume of steam through the turbine at all loads than is possible when the standard speed governing valves are operating to throttle the steam.

The boiler efficiency is increased by the reduced steam pressure because the saturation temperature of the boiling water is reduced so that the temperature difference between the source of heat which includes the furnace and the gases discharged from it, and the boiler tubes, is increased, with the result that the boiler surface will absorb more heat and discharge less to the flue in cooler flue gases, and the boiler efficiency, which is the ratio of the heat absorbed by the water and steam to that of the fuel fired, will be higher at the reduced light load pressure than if the pressure had not been reduced at light load.

With the foregoing in view I will now describe, in connection with the accompanying diagrammatic showing forming a part of this specification, one manner whereby the invention may be carried into practice.

Referring to the diagram, A is a boiler containing heat transfer surface which includes steam generating tubes and a superheater as shown which receives steam from the steam and water drum of the boiler and delivers it through the connection B to the steam turbine C driving the electric generator D, the turbine being controlled by the usual and well known throttling valve mechanism E adjusted through a lever system by the speed actuated means F driven by the turbine C.

The boiler A is supplied with fuel through suitable means G such as an oil burner, the supply line to which contains a regulating valve H the lever of which is linked by the member I to one arm of a bell crank J having a fixed pivot and the other arm of which is connected by a link K to the operating lever of a flue damper L which controls the air to the burner G, it will thus be evident that fuel and air are co-incidentally adjusted. Other usual readjusting means may be interposed between the two if desirable. Also the fuel firing means may take any suitable form such as pulverized fuel, a stoker or the like, and the boiler may be of any type such as a forced flow once-through, recirculation or a spillover type such as is described in the present pending patent applications of E. G. Bailey, Ser. No. 55,020, filed December 18, 1935, and E. G. Bailey et al. Ser. No. 55,021, filed December 18, 1935, with attendant control dovetailed with the control about to be described.

According to the present invention steam pressure is reduced as load is reduced, but without abandonment of the speed actuated control valve E functioning from turbine speed through the means F to throttle the steam to the turbine C as is customary practice. Thus there is in my invention a dual control, the speed actuated turbine valve steam throttling mechanism being relied upon for immediate response to increase of demand, and the steam pressure for a sustained condition, the former neutralizing the effect of time lag that is inherently different in boilers with water storage, natural or pump circulation type as distinguished from a once through, or a forced flow boiler of the type described in the above mentioned applications.

The primary control is by variation of steam pressure according to turbine load, and is accomplished by some measure of load as an actuator to cause the steam pressure to rise and fall with load. The secondary control corrects the steam pressure when necessary to insure a selected pressure drop through the turbine valve opening that is regulated for turbine speed by the usual speed actuated governor mechanism which is effective only when there is sufficient pressure drop through the valve opening.

Utilization of the method of this invention embraces existing described boiler and turbine governing valve controls but adds thereto apparatus to accomplish the method.

Again referring to the diagrammatic showing in the accompanying drawing the pressure from boiler A on the supply line to the superheater is connected by M to act upon a diaphragm or Sylphon 2 which raises or lowers the fulcrum pivot 3 of a rocking lever 4, one end of which is connected at 5 to a link 6 joining it at 7 to the bell crank lever J for adjustment of fuel valve H and damper L. Toward the other end the rocking lever 4 supports an adjustably positioned weight 8 opposing steam pressure; between 3 and 5 on rocking lever 4 is an adjustable fulcrum 9 for the lever which fulcrum is connected by a link 10 with one arm 11 of a bell crank lever pivoted at 12 and the other arm 13 of which is pivotally connected to one end of a rod 14 moved up and down by a load actuated device 13ª responsive to changes in load upon the generator D; this electric load actuated or measuring device 13ª may be of any well known form and is so connected that as the electrical output of the generator D increases the fulcrum 9 is moved nearer 3, and as it decreases fulcrum 9 is moved toward 5. Thus, in effect two elements are added to the damper and fuel regulator, to wit—the sliding fulcrum support 9 which varies the force or moment on the Sylphon 2, for a given position of the dead weight 8, and a sliding adjustment of the dead weight 8 on the lever 4 which has the same effect. A rise in steam pressure thus reduces liberation of heat in the furnace.

The sliding fulcrum 9 is moved so that with increased load it is nearer 3 on the lever 4 and thus with a given position of the dead weight 8 the downward force at 3 is increased and the lever 4 moves to increase the combustion rate until a higher pressure restores equilibrium. Of course, any other measure of turbine load than electrical output of a generator may be connected to produce the same result.

With the boiler pressure at which a given load is carried there may be no pressure drop through the turbine governing valve E which would be the case with valve E wide open. Under this condition change of load could not change the pressure fast enough to maintain turbine speed due to time lag between actuation of boiler controls and resultant new rate of steam generation. On the other hand, for a given boiler pressure at which a given load is carried there may be a pressure drop through the valve E because it is not wide open, and then the turbine governor can control speed by opening or closing the valve as usual within limits. The limit is fixed by the condition that with an increasing load that opens valve E, and so tends to lower the pressure, the rate of steam generation will have increased before the pressure has fallen so far that the turbine speed cannot be held with the new higher load.

It is therefore desirable to provide means that will maintain the desired conditions and insure predetermined or adjustable pressure drop through the governing valve which thus would operate nearly wide open all of the time. This condition is taken care of in the apparatus as shown diagrammatically, by a piston 15 in a cylinder 16 receiving steam pressure on opposite sides of the piston from opposite sides of the throttle valve E through connections 17 and 18. Thus the piston has the tendency to position itself in accordance with the pressure drop through the valve E by reason of the fact that it has acting on it a force proportional to valve pressure drop in one direction and another force in an opposite direction, this last named force here being shown as an adjustable spring 19 therefore, whenever the valve pressure drop through E exceeds a given value, the dead weight 8 on the boiler control lever 4 is moved by means of the bell crank lever 20 and link 21 connected in the slot 22 of the dead weight 8 thus reducing the boiler pressure.

By the primary control of boiler pressure in accordance with some measure of turbine load, and a secondary corrective control to maintain a given pressure drop through the turbine governor valve, or a given normal position of that valve, the turbine speed is maintained at all loads, and the boiler pressure will always be as low as necessary to carry the load and thus the turbine operation more or less closely approaches that of constant steam volume at all loads thereby effecting the economies sought.

While in the foregoing I have described a diagrammatic apparatus it is to be understood that various present commercial control units may be coupled together to provide the described apparatus and method of operation without departing from the scope of the invention.

I claim:

1. The method of operating a steam boiler with controlled air fuel ratio in combination with a turbine having a throttle valve which comprises adjusting the rate of combustion from a measure of steam pressure and turbine load, and readjusting from a measure of pressure drop across the throttling valve whereby operation of the turbine at all loads appproaches constant steam volume.

2. In apparatus of the character set forth, a steam boiler having a supply of working medium and a turbine, means supplying elements of combustion to the boiler in controlled ratio, a throttle valve and speed actuated governing mechanism therefor between the turbine and boiler, means adjusting the rate of combustion from a measure of steam pressure and turbine load, and means for readjusting said last named means from a measure of a pressure drop across the throttling valve.

3. In apparatus of the character set forth, a vapor generator and a turbine supplied with vapor from said generator, means for supplying fuel to the generator, means for varying the rate of supply of fuel to the generator according to changes in the pressure of the vapor generated from a predetermined value, and means for changing said predetermined value in accordance with the load on the turbine.

4. In apparatus of the character set forth, a vapor generator and a vapor motor having a throttle valve supplied with vapor from the generator, means for supplying fuel to the generator, means for varying the rate of supply of fuel to the generator according to changes in the pressure of the generated vapor from a predetermined value, and means for changing said predetermined value in accordance with the pressure drop across the throttle valve.

5. In apparatus of the character set forth, a vapor generator and a vapor motor supplied with vapor from the generator, a throttle valve for varying the pressure of the vapor admitted to said motor, means responsive to the pressure drop across said throttle valve, means responsive to the load on said motor, means responsive to the pressure of the vapor generated, and means under the joint control of said last three named means for varying the rate of fuel supply to said generator.

6. In apparatus of the character set forth, a steam boiler having a supply of working medium and a turbine, means supplying elements of combustion to the boiler in controlled ratio, a throttle valve between the turbine and boiler, means adjusting the rate of combustion from a measure of steam pressure and turbine load, and means for readjusting said last named means from a measure of pressure drop across the throttling valve.

7. In apparatus of the character set forth, a vapor generator and a vapor motor supplied with vapor from the generator, means responsive to the pressure of the vapor generated for varying the rate of fuel supply to said generator to maintain the pressure of the vapor generated at a predetermined value, means responsive to the load on said motor, and means actuated by said last named means for varying the predetermined pressure maintained by said first named means.

8. In apparatus of the character set forth, a vapor generator and a vapor motor supplied with vapor from a generator, means responsive to the pressure of the vapor generated for varying the rate of fuel supply to said generator to maintain the pressure of the vapor generated at a predetermined value, a throttle valve for varying the pressure of the vapor admitted to said motor, and means responsive to the pressure drop across said throttle valve for varying the predetermined vapor pressure maintained by said first named means.

9. In apparatus of the character set forth, a vapor generator and a vapor motor supplied with vapor from the generator, a throttle valve for varying the pressure of the vapor admitted to said motor, means responsive to the pressure of the vapor generated for varying the fuel supply to said generator to maintain the pressure of the vapor generated at a predetermined value, means responsive to the load on said motor, means responsive to the pressure drop across said throttle valve, and means under the joint control of said last two named means for varying the predetermined pressure maintained by said first named means.

10. In apparatus of the character set forth, a vapor generator and a vapor motor supplied with vapor from the generator, means responsive to the pressure of the vapor generated for varying the rate of fuel supply to said generator to maintain the pressure of the vapor generated at a predetermined value, and means responsive to the load on said motor co-acting with said first named means for varying the predetermined pressure maintained in correspondence with the load on said motor.

11. In apparatus of the character set forth, a vapor generator and a vapor motor supplied with vapor from the generator, a lever having a neutral position, a fulcrum about which said lever is positioned, means for positioning said lever about said fulcrum in accordance with changes in the pressure of the vapor generated from a predetermined value, fuel supply means actuated by said lever whereby movements of said lever from the neutral position varies the rate of fuel supply to said generator to restore said lever to the neutral position, and means responsive to the load on said motor for varying the position of said fulcrum so that the vapor pressure necessary to maintain said lever to the neutral position is varied in correspondence with the load on said motor.

CHARLES E. LUCKE.